United States Patent [19]

Tsutsumi

[11] Patent Number: 4,641,624
[45] Date of Patent: Feb. 10, 1987

[54] EXHAUST GAS RECIRCULATION CONTROL METHOD AND APPARATUS FOR INTERNAL COMBUSTION ENGINE

[75] Inventor: Kazumichi Tsutsumi, Hyogo, Japan

[73] Assignee: Mitsubishi Denki Kabushiki Kaisha, Tokyo, Japan

[21] Appl. No.: 576,648

[22] Filed: Feb. 3, 1984

[30] Foreign Application Priority Data

Feb. 3, 1983 [JP] Japan ................... 58-17137

[51] Int. Cl.$^4$ ........................................ F02M 25/06
[52] U.S. Cl. .................................................. 123/571
[58] Field of Search ..................... 123/568, 569, 571

[56] References Cited

U.S. PATENT DOCUMENTS

| 4,244,023 | 1/1981 | Johnson | 123/340 X |
| 4,257,382 | 3/1981 | Matsui et al. | 123/571 |
| 4,378,776 | 4/1983 | Nishimori | 123/571 |
| 4,378,777 | 4/1983 | Iida et al. | 123/571 |
| 4,428,355 | 1/1984 | Yokooku | 123/571 |
| 4,448,177 | 5/1984 | Hasegawa et al. | 123/571 |
| 4,448,178 | 5/1984 | Yamato et al. | 123/571 |
| 4,467,775 | 8/1984 | Buck et al. | 123/571 |

FOREIGN PATENT DOCUMENTS 2098360 11/1982 United Kingdom .

Primary Examiner—Willis R. Wolfe, Jr.
Attorney, Agent, or Firm—Sughrue, Mion, Zinn, Macpeak & Seas

[57] ABSTRACT

A method for effecting exhaust gas recirculation control in an exhaust gas recirculation control device of a type including a needle valve provided in an exhaust gas recirculation passage for determining the effective diameter of that passage, a position sensor for providing a signal representing the actual position of the needle valve, and a negative pressure motor for positioning the needle valve. In accordance with the invention, a target value for the needle valve is set according to predetermined operating conditions of the engine. The negative pressure motor is driven with a drive pulse having a time width corresponding to a positional deviation between the target value and the actual position of the needle valve as represented by the signal provided by the position sensor. After driving the negative pressure motor with one such drive pulse, the generation of the next subsequent drive pulse is inhibited for a predetermined period of time longer than the delay times in the device.

7 Claims, 6 Drawing Figures

EXHAUST GAS RECIRCULATION CONTROL METHOD AND APPARATUS FOR INTERNAL COMBUSTION ENGINE

BACKGROUND OF THE INVENTION

The present invention relates to a method and device for controlling the amount of exhaust gas recirculation (hereinafter abbreviated to "EGR" when applicable) in an internal combustion engine of an automobile or the like.

In a modern internal combustion engine, an electronic device such as a microcomputer is used to control the amount of EGR. In general, the amount of EGR is set by the operating position of needle valve in an EGR passage, which is in turn determined by various operating conditions of the engine. Particularly, the effective diameter of the EGR passage changes with the movement of the needle valve, and the amount of EGR is changed in proportion to the effective diameter. Therefore, EGR control can be achieved by feeding the operating position of the needle valve back and differencing it with the target position which is defined according to the desired amount of EGR.

The general arrangement and operation of a conventional device of this type will be described with reference to FIGS. 1 and 2. Further details of such a device are described in U.S. Pat. No. 4,257,382.

In FIG. 1, reference numeral 10 designates an EGR passage communicating the exhaust pipe of an engine (not shown) with the engine's intake manifold; 20, a needle valve provided in the EGR passage; 30, a position sensor for detecting the operating position of the needle valve 20; 40, a negative pressure motor or actuator, having a spring 41 and a diaphragm 42, for driving the needle valve 20 with a negative air pressure; 50, a solenoid valve including a valve 52 for opening the operating negative pressure chamber of the negative pressure motor 40 to the atmosphere and a solenoid 51 for operating the valve 52; 60, a solenoid valve composed of a valve 62 for opening the operating negative pressure chamber to a negative pressure source (for instance, the intake manifold) and a solenoid 61 for operating the valve 62; and 70, a control device implemented with a microcomputer. More specifically, the control device 70 includes a target value setting unit 71 for setting a target value a for the operating position of the needle valve 20 according to operating parameters of the engine, such as the engine speed and the temperature of the coolant, and a driving unit 72 for driving the negative pressure motor through the solenoid valves 50 and 60 according the positional deviation c between the target value a and the actual position b of the needle valve 20 which is detected by the position sensor 30. FIG. 1 shows in a sectional view the EGR passage 10 and the negative pressure motor.

In the device thus constructed, as the needle valve 20 is moved upwardly in FIG. 1, the effective diameter of the EGR passage 10 is increased, and as the needle valve 20 is moved downwardly, the effective diameter is decreased. Therefore, the effective diameter of the EGR passage is determined from the position b of the needle valve 20, and the EGR amount is determined from the effective diameter. That is, a desired amount of EGR can be obtained by setting the position b of the needle valve to a desired value. The aforementioned setting unit 71 is operated to set the position b of the needle value to a desired value.

A general description of the control of the needle valve 20 will be made with reference to a timing chart shown in FIG. 2.

In FIG. 2, a indicates the above-described target value; b, the aforementioned actual position; d, the open and closed states of the valve 62; and e, the open and closed states of the valve 52.

For instance, when the target value a is increased to open the EGR passage with the operation of the engine at the time instant $T_1$, the positional deviation c is increased in the positive direction. In this case, the driving unit operates in response to the increase of the positional deviation c to open the valve 62 and to close the valve 52. As a result, the operating negative pressure chamber of the negative pressure motor 40 is opened through the valve 62 to the negative pressure source. Accordingly, the diaphragm 42 is pulled by the operating negative pressure against the force of the spring 41, while the needle valve 20 opens the EGR passage in assocation with the movement of the diaphragm 42. At the same time, the actual position b of the needle valve 20 is moved upwardly by this operation. The actual position reaches the target value a soon, and the positional deviation c is eliminated. Thereupon, the driving unit 72 operates to close both of the valves 52 and 62, as a result of which the operating negative pressure is held in the negative pressure chamber of the negative pressure motor 40 so that the actual position b of the needle valve 20 is maintained unchanged.

When the target value a is decreased to close the EGR passage at the time instant $T_2$, the positional deviation c is increased in the negative direction. In this case, the driving unit 72 operates in response to the decrease of the target value a to open the valve 52 and to close the valve 62. As a result, the negative pressure chamber of the negative pressure motor 40 is opened to the atmosphere. Accordingly, the diaphragm is pushed downwardly by the force of the spring 41 while the needle valve 20 is also moved in the direction of closing the EGR passage 10. At the same time, the actual position b of the needle valve 20 is moved downwardly. The actual position b soon reaches the target value a, and the positional deviation c is eliminated. Thereupon, the driving unit 72 closes both of the valves 52 and 62, as a result of which the operating negative pressure is held in the operating negative pressure chamber of the motor 40 and the actual position b of the needle valve 20 is maintained unchanged. Thus, the position of the needle valve 20 is controlled to a value suitable for the operation of the internal combustion engine with the amount of EGR set to a suitable value.

It should be noted that the above general description of the needle valve position control disregards all the delays of operation which are involved in various parts of the control system, that is, the description has been made on the premise that the control system is ideal. In practice, the control system involves various delays of operation. For instance, the solenoid valve 50 or 60 takes a certain period of time to accomplish its opening or closing operation after it receives the drive signal, and the negative pressure motor 40 starts its driving operation a predetermined period of time after the valve has been closed or opened. FIG. 3 is a timing chart showing such delays of operation in the control system. In FIG. 3, f indicates a drive signal for opening and closing the solenoid valve 60; g, a drive signal for opening and closing the solenoid valve 50; and b, the actual position of the needle valve. FIG. 3 shows the delays which occur until the results of the drive signals f and g outputted by the control device 70 are fed back. As shown in FIG. 3, the feedback system includes times delays $t_1$, $t_2$, $t_3$ and $t_4$. For instance, for the time $t_2$ after the "open" state of the drive signal f of the solenoid valve 60 has been changed to the "closed" state, the actual position b continues to move upwardly, and for the time $t_4$ after the "open" state of the drive signal g of the solenoid valve 50 has been changed to the "closed" state, the actual position b continues to move downwardly. Since it takes a certain period of time for the control device 70 to perform its processing operation, a sampling period required for the control device 70 to sample the actual position b has a finite value. The delay due to the sampling period increases the aforementioned delay times $t_1$, $t_2$, $t_3$ and $t_4$, thus causing a so-called "limit cycle phenomenon" in which the feedback actual position varies around the target position with a certain period. The limit cycle phenomenon results in positional "hunting".

This hunting phenomenon will be described with reference to the timing chart of FIG. 4. In FIG. 4, h indicates the sampling period $T_s$ of the actual position b of the control device 70. The other waveforms are the same as shown in FIGS. 2 and 3. It is assumed that the target value a increases. In this case, in synchronization with the sampling time, the drive signal f has the "open" state, and the actual position b moves upwardly, soon reaching the target value a. Since the sampling period $T_s$ is not zero, the drive signal f is maintained in the "open" state until the next sampling time after the actual position b has reached the target position a. At this next sampling time, the drive signal f will be in the "closed" state while the drive signal g will be in the "open" state. However, since the driving system incurs delays as described, for a certain period of time after the sampling time, the actual position b continues to move upwardly, as a result of which an overshoot occurs, as indicated at $P_1$ in FIG. 4. After the delay times have passed, the actual position b starts moving downwardly. In this operation, as in the upward movement, an undershoot occurs, as indicated at $P_2$ in FIG. 4. Subsequently, the overshoot and the understood are repeated.

Accordingly, an object of the present invention is to eliminate the position hunting phenomenon due to the delays of operation in the position control system and the finite sampling period. More specifically, an object of the invention is to provide an exhaust gas recirculation control method in which no hunting phenomenon is present and the position control is stable.

SUMMARY OF THE INVENTION

In accordance with the above and other objects of the invention, an exhaust gas recirculation control method is provided for operating an exhaust gas recirculation control device including a needle valve provided in an exhaust gas recirculation passage for setting an effective diameter of the passage, a position sensor for detecting a position of the needle valve, and a negative pressure motor for moving the needle valve. The method of the invention includes steps of setting a target value for the needle valve according to predetermined operating conditions of the engine, driving the negative pulse motor with a drive pulse having a time width corresponding to a positional deviation between the target value and an actual position detected by the position sensor, and prohibiting the pulse driving unit from outputting a next subsequent drive pulse for a predetermined period of time following the preceding drive pulse. The predetermined period of time should be longer than the sum of delay times between an output of the position sensor and the actual position of the needle valve.

DESCRIPTION OF THE PREFERRED EMBODIMENTS

A preferred embodiment of the invention will be described with reference to FIGS. 5 and 6.

Figure 1:
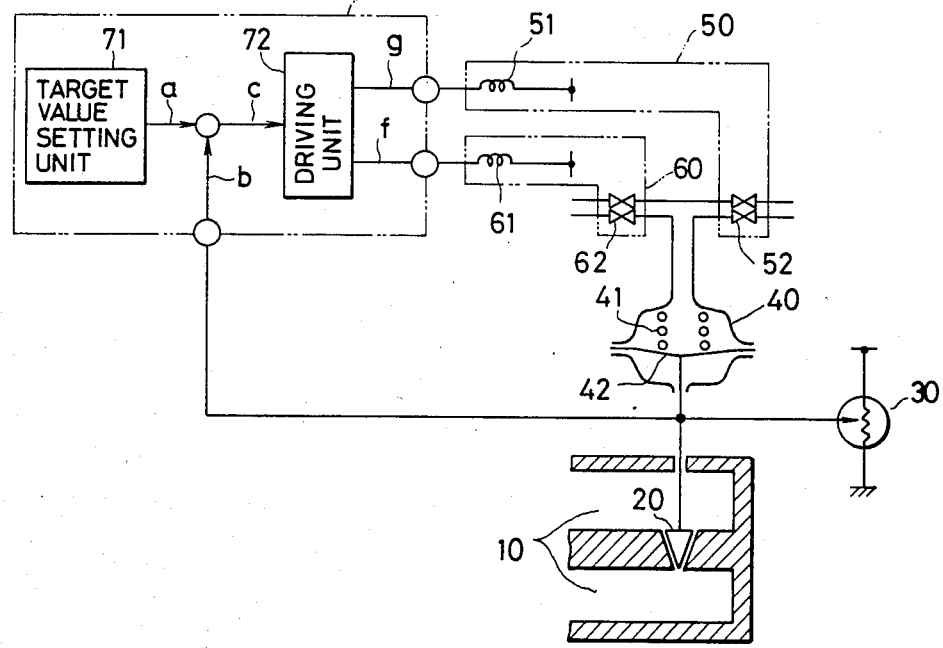
FIG. 1 is an explanatory diagram showing the general arrangement of a conventional EGR control device.
Figure 2:
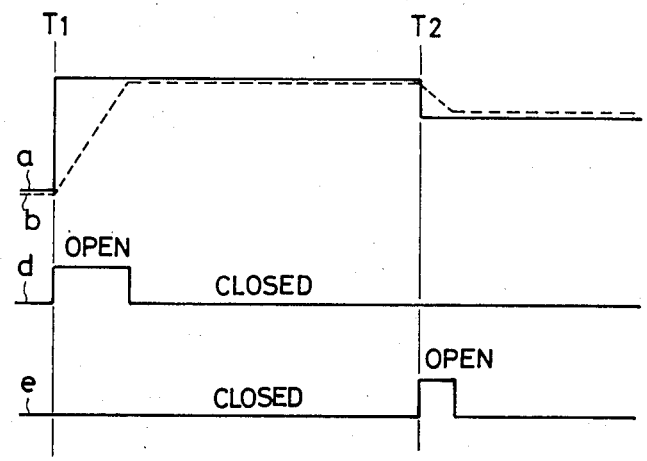
FIG. 2 is a timing chart used for a description of the opertions of various elements in the device of FIG. 1.
Figure 3:
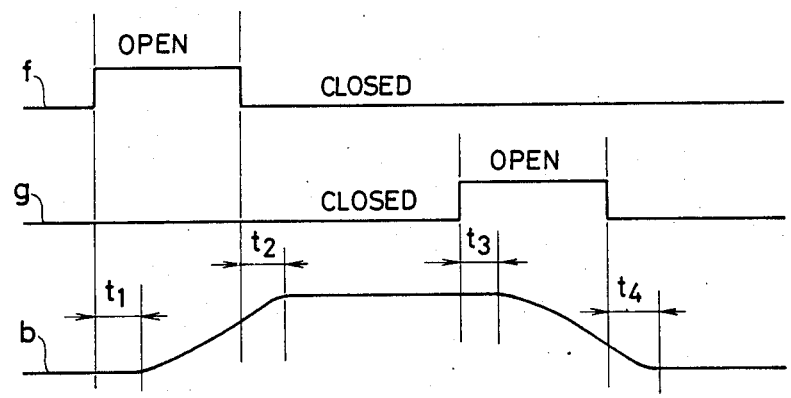
FIG. 3 is a timing chart showing the delays of operation in the device in FIG. 1.
Figure 5:
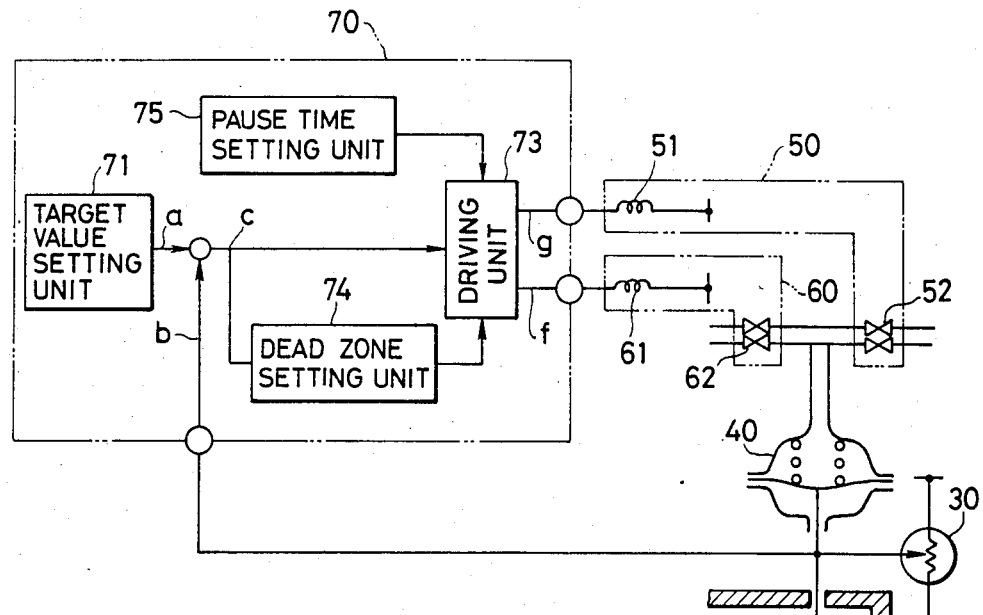
FIG. 5 is an explanatory diagram showing the arrangement of an EGR control device constructed according to the invention.

FIG. 5 shows the arrangement of an EGR control device for an internal combustion engine constructed and operating according to the invention. In FIG. 5, those components which have been previously described with reference to FIG. 1 are designated by the same reference numerals or characters. In FIG. 5, reference numeral 73 designates a pulse driving unit for generating a pulse having a width proportional to the value of the aforementioned position deviation c as a drive signal f or g according to the nature of the deviation; 74, a dead zone setting unit which, when the value of the deviation c is in a predetermined range $P_E$, causes the driving unit 73 to stop its pulse generating operation so that both the signals f and g are placed in the "closed" state; and 75, a pause time setting unit which, after the driving unit 73 has accomplished its pulse generating operation. causes the driving unit 73 to stop the generation of a new pulse for a certain period of time $T_W$.

The operation of the device thus arranged will be described with reference to FIG. 6.

Figure 4:
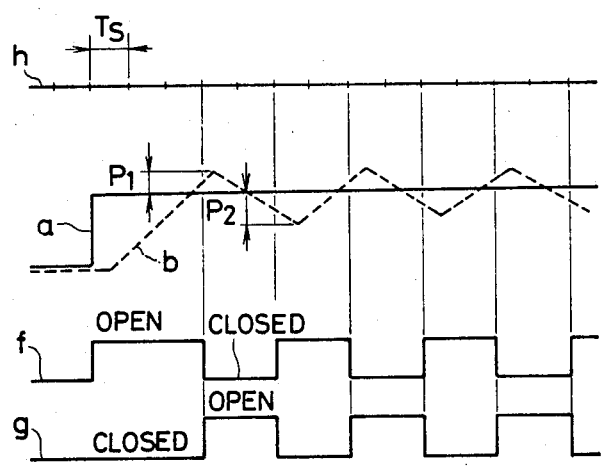
FIG. 4 is a timing chart used for a description of a hunting phenomenon in the device of FIG. 1.
Figure 6:
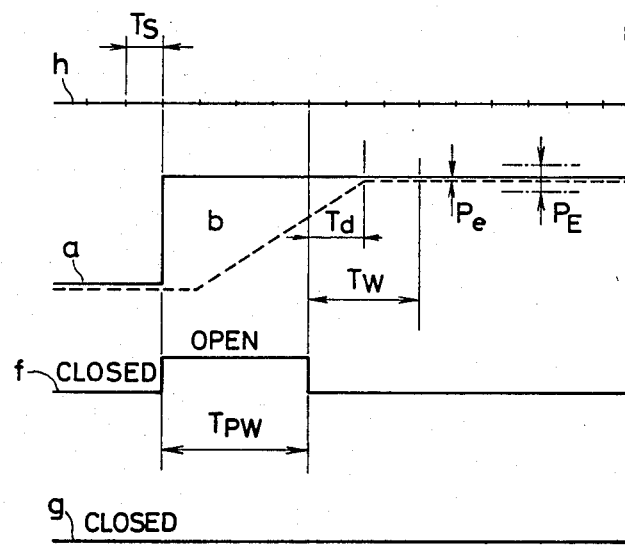
FIG. 6 is a timing chart used for a description of the operations of various elements in the device of FIG. 5.

The a, b, f, g and h signals shown in FIG. 6 are the same as those in FIG. 4.

It is assumed that the target value a is increased with the variation of the operating condition of the internal combustion engine. In this case, the pulse driving unit 73 generates a pulse having a time width $T_{PW}$ proportional to the positional deviation c (absolute value) which results from the increase of the target value a, to cause the drive signal f to be in the "open" state for the time $T_{PW}$. As a result, the actual position b is increased. Since the amount of increase of the actual position b depends on the characteristics of the negative pressure motor 40, if the proportional relationship between the time width $T_{PW}$ and the positional deviation c is suitably determined according to the characteristics of the motor, then the pulse driving causes the actual position b to approach the target value a. Since the position control system involves delays as described above, a certain time $T_d$ passes from when the pulse has been outputted until the pulse driving affects the actual position b.

Thus, at the time instant that the pulse is outputted, the actual position b has not reached the target position a and a deviation c still remains. However, during the delay time $T_d$, due to the action of the pause time setting unit 75, no pulse is newly outputted and the valves 50 and 60 remain closed. A pulse can again be outputted after a time $T_W$ which is set by the setting unit 75. If the time $T_W$ is set to be longer than the delay time $T_d$, then after the passage of the time $T_W$ the result of the pulse driving reflects sufficiently on the actual position b and therefore the deviation c is extremely small ($P_e$). If the deviation $P_e$ is smaller than the value $P_E$ which is set by the dead zone setting unit 74, by the action of the setting unit 74 the drive signals f and g continue to be in the "closed" state and the actual position b remains near the target value a. If the deviation $P_e$ is larger than the value $P_E$, a pulse is newly outputted. Thus, as in the above-described operation, the pulse is successively outputted until the deviation $P_e$ becomes smaller than the value $P_E$. As long as the relationship between the drive pulse width $T_{PW}$ and the positional deviation c is set suitably, the number of pulses outputted is not so large; that is, the actual position b is controlled to the target value a with the dead zone width ($P_E$).

The above description has been made with reference to the case where the target value a is increased. In the case where the target value is decreased, the drive signal f is pulsed and control is carried out is essentially the same manner.

As is apparent from the above description, according to the invention, a drive period corresponding to a pulse width determined according to the deviation between the actual position of the EGR control valve and the target value and the pause period of pulse driving according to the delay of the control system is provided. Therefore, the occurrence of the hunting phenomenon due to the delay of the control system is prevented. Accordingly, the EGR control method according to the invention provides stable position control.

I claim:

1. An exhaust gas recirculation control method for operating an exhaust gas recirculation control device including a needle valve provided in an exhaust gas recirculation passage for setting an effective diameter of said passage, a position sensor for providing a signal representing a position of said needle valve, and a negative pressure motor for positioning said needle valve, comprising the steps of:

setting a target value for said needle valve according to predetermined operating conditions of said internal combusion engine;

measuring a positional deviation between said target value and an actual position of said needle valve as represented by said signal provided by said position sensor;

driving said negative pressure motor with only a single drive pulse having a time width corresponding to said measured positional deviation; and prohibiting, after driving said negative pressure motor with one said drive pulse, for a predetermined period of time generation of a next subsequent drive pulse according to a newly measured positional deviation, said prohibiting being effective only after said negative pressure motor has been driven with a drive pulse.

2. The exhaust gas recirculation control method of claim 1, wherein said predetermined period of time is longer than a delay time between an occurrence of a change in said signal provided by said position sensor and a corresponding change in a position of said needle valve.

3. The exhaust gas recirculation control method of claim 2, wherein said width of said drive pulse is in proportion to said positional deviation between said target value and said actual position of said needle valve.

4. An exhaust gas recirculation control apparatus for operating an exhaust gas recirculation control device including a needle valve provided in an exhaust gas recirculation passage for setting an effective diameter of said passage, a position sensor for providing a signal representing a position of said needle valve, and a negative pressure actuator for positioning said needle valve by a negative pressure, comprising:

means for setting a target value for said needle valve according to predetermined operating conditions of said internal combustion engine;

means for measuring a positional deviation between said target value and an actual position of said needle valve as represented by said signal provided by said position sensor;

means for driving said negative pressure actuator with only a single drive pulse having a time width corresponding to said measured positional deviation;

pause time setting means for prohibiting, after said negative pressure actuator has been driven with a single drive pulse, generation of a next subsequent drive pulse for a predetermined period of time, said generation of said next subsequent drive pulse corresponding to a subsequently measured positional deviation; and dead zone setting means for prohibiting, when the positional deviation between the target value and the actual position is less than a predetermined set value, generation of the drive pulse from said driving means.

5. The exhaust gas recirculation control apparatus of claim 4, wherein said dead zone setting means is operative so that when said positional deviation between the target value and the actual position detected by said position sensor is greater than said predetermined set value, said driving means generates the drive pulse after a lapse of said predetermined period of time of said pause time setting means.

6. The exhaust gas recirculation control apparatus of claim 4, wherein said predetermined period of time is longer than a delay time between an occurrence of a change in said signal provided by said position sensor and a corresponding change in position of said needle valve.

7. The exhaust gas recirculation control apparatus of claim 4, wherein said negative pressure actuator is connected through a solenoid valve to a negative source, said solenoid valve being controlled by said drive pulse of said driving means.

* * * * *